United States Patent
Jorgovanovic et al.

(10) Patent No.: US 10,243,864 B1
(45) Date of Patent: Mar. 26, 2019

(54) SYSTEM FOR MODIFYING DATA RATES USED BY AUDIO DEVICES

(71) Applicant: AMAZON TECHNOLOGIES, INC., Seattle, WA (US)

(72) Inventors: Milos Jorgovanovic, Mountain View, CA (US); Jin Guo, Cupertino, CA (US); Morris Yuanhsiang Hsu, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 71 days.

(21) Appl. No.: 15/403,036

(22) Filed: Jan. 10, 2017

(51) Int. Cl.
| | | |
|---|---|---|
| H04W 4/06 | (2009.01) | |
| H04L 12/825 | (2013.01) | |
| H04L 29/06 | (2006.01) | |
| H04L 12/26 | (2006.01) | |

(52) U.S. Cl.
CPC .......... *H04L 47/25* (2013.01); *H04L 43/0823* (2013.01); *H04L 43/16* (2013.01); *H04L 65/4076* (2013.01)

(58) Field of Classification Search
None
See application file for complete search history.

(56) References Cited

U.S. PATENT DOCUMENTS

| | | | | |
|---|---|---|---|---|
| 8,693,331 | B1* | 4/2014 | Sampath | H04W 28/22 370/232 |
| 2001/0046875 | A1* | 11/2001 | Davies | H04L 1/1835 455/507 |
| 2007/0245203 | A1* | 10/2007 | Cho | H04L 1/0009 714/748 |
| 2009/0323577 | A1* | 12/2009 | Agrawal | H04L 1/0026 370/312 |
| 2011/0010592 | A1* | 1/2011 | Takayanagi | H04L 1/1867 714/704 |
| 2012/0079329 | A1* | 3/2012 | Steinbach | H04N 19/176 714/704 |
| 2014/0133303 | A1* | 5/2014 | Jia | H04L 1/0002 370/232 |
| 2015/0098576 | A1* | 4/2015 | Sundaresan | H04R 29/00 381/58 |

\* cited by examiner

*Primary Examiner* — Sithu Ko
(74) *Attorney, Agent, or Firm* — Lindauer Law, PLLC

(57) ABSTRACT

Described are techniques for modifying the data rate used to transmit audio data from a master device to slave devices. After receiving a signal, each slave device requests transmission of one or more packets and reports an individual error rate. A cumulative error rate may also be determined based on the individual error rates and the retransmission requests. If any individual error rate or the cumulative error rate exceeds a maximum threshold, the data rate used to transmit the audio data is decreased. If an individual error rate is less than a minimum threshold, the data rate may be increased. If an error rate exceeds a critical threshold, the data rate may be reduced to a minimum value supported by the devices.

20 Claims, 7 Drawing Sheets

SYSTEM FOR MODIFYING DATA RATES USED BY AUDIO DEVICES

BACKGROUND

When configuring a group of networked audio devices to provide a synchronized audio output, the physical data rate (e.g., the bit rate) used to provide data to the audio devices may be constrained by characteristics of the audio devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
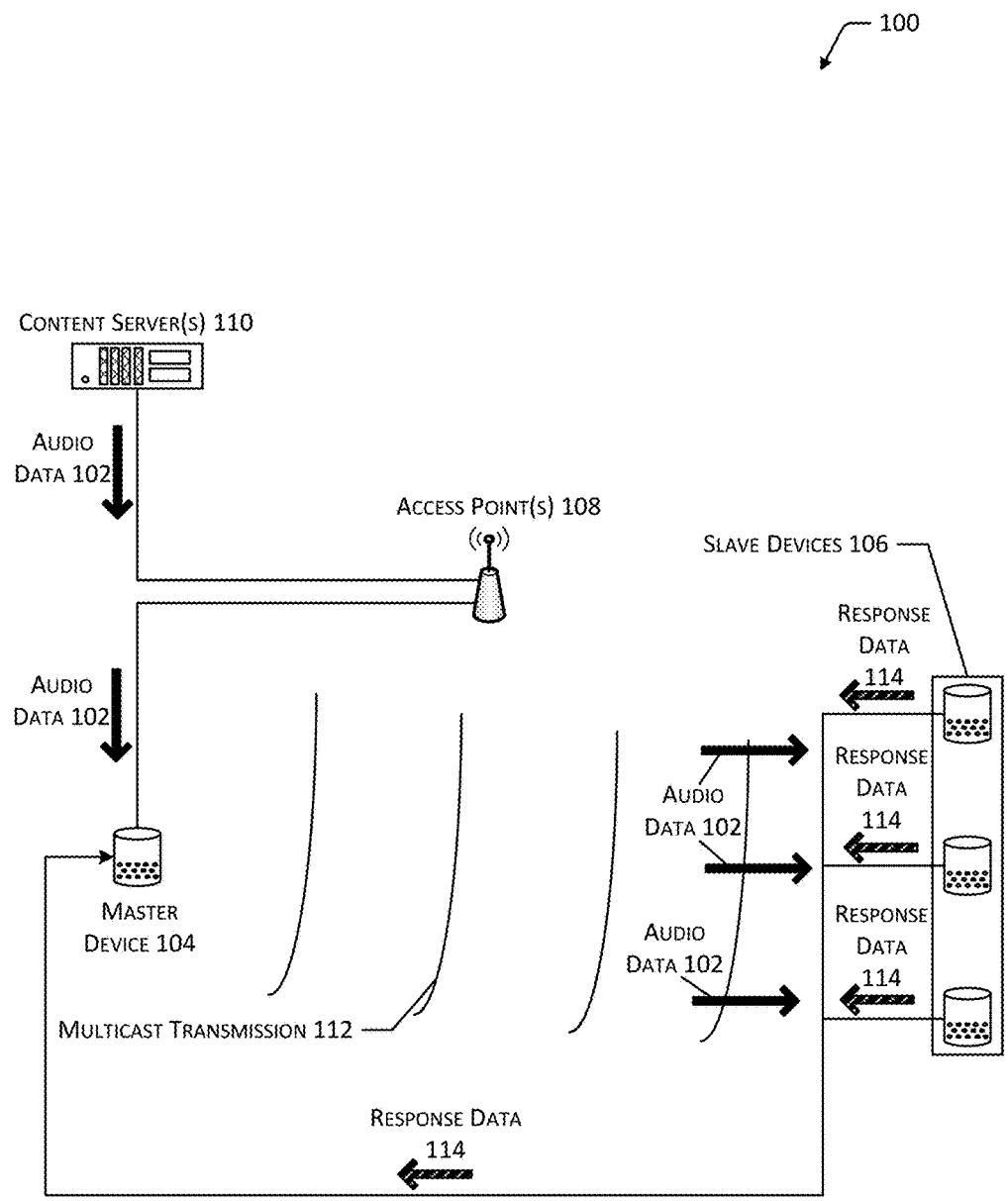
FIG. 1 depicts an implementation of a system for determining a physical data rate for transmission of audio data from a master device to one or more slave devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Audio systems may include multiple audio devices, in communication with one another via one or more networks, to provide a synchronized audio output to users within an environment. In some cases, a user may select a particular group of audio devices to be used, such as a set of audio devices within a particular room of a home, or all of the audio devices located on a particular floor of the home, all of the audio devices located within the entire home, and so forth. The user may also select a particular audio application for use or particular audio content for output. Based on the location and other device characteristics of each audio device, the timing and volume of the audio output for each audio device may be configured. For example, a time delay between various audio streams provided to different devices may be used to synchronize the audio output. As another example, different devices may be used to provide audio output at different volumes based on distance from a listening position, different channels of a surround-sound output, and so forth.

However, the reliability by which data may be transmitted between audio devices may be affected by a variety of factors, such as the physical data rate (e.g., the bit rate) used to transmit audio data. For example, use of a high physical data rate may minimize the airtime and other network resources used to provide audio data from one audio device to another. However, data packets transmitted at a high data rate may not reliably be received by a receiving device, especially if the receiving device is located a significant distance from the sending device, or if other characteristics of the audio devices, network, or environment may hinder receipt of the data packets. Conversely, data packets transmitted at a low data rate may be more reliably received by receiving devices. However, use of a low data rate consumes additional airtime and other network resources to enable the data packets to reach the receiving device. Additionally, in such cases, a longer data packet may be more likely to be affected by interference caused by noise or other devices in the environment.

Described in this disclosure are techniques for determining a physical data rate that may be used to provide audio data from a first audio device within a group (e.g., a master device) to one or more other audio devices within the group (e.g., slave devices). In some cases, the physical data rate may be modified based on data determined from the slave devices. For example, multiple audio devices may communicate with one or more access points via a Wi-Fi network (e.g., using protocol that corresponds at least in part to section 802.11 of the specifications set forth by the Institute of Electrical and Electronics Engineers (IEEE)). In some cases, audio data may be provided from a master audio device to a slave audio device via communication links with the access point(s). Example implementations for forming a group of audio devices associated with an access point are described in U.S. patent application Ser. No. 15/245,897, filed Aug. 24, 2016, entitled "System for Configuring Distributed Audio Output Using an Access Point", which is incorporated by reference herein in its entirety. In other cases, a master device may be configured to provide audio data to multiple slave devices simultaneously using a multicast transmission. Example implementations for forming a group of audio devices in which a master device distributes audio data to multiple slave devices via a multicast transmission are described in U.S. patent application Ser. No. 15/246,070, filed Aug. 24, 2016, entitled "System for Configuring Distributed Audio Output Using a Designated Audio Device", which is incorporated by reference herein in its entirety. A group of audio devices may also use a combination of multicast transmissions and communication via an access point or unicast transmissions to distribute audio data. Example implementations for distributing data to generate an audio output using multiple devices are described in U.S. patent application Ser. No. 15/357,579, filed Nov. 21, 2016, entitled "System for Distributing Audio Output using Multiple Devices", which is incorporated by reference herein in its entirety. Example implementations for distributing audio data using both multicast transmissions and transmissions via an access point are described in U.S. patent application Ser. No. 15/373,677 filed Dec. 9, 2016, entitled "System for Configuring Audio Devices to Distribute Audio Data", which is incorporated by reference herein in its entirety.

A master device, in communication with multiple slave devices, may begin providing audio data to the slave devices at an initial physical data rate. In some implementations, the initial physical data rate may be determined in part on device characteristics of the slave devices or data received from the slave devices. For example, the master device, or another computing device able to receive data from the slave devices, may determine one or more signal quality measurements from the slave devices. Signal quality measurements may include one or more of a received signal strength indicator (RSSI), signal to noise ratio (SNR), packet error rate (PER), modulation and coding scheme (MCS) indicating physical data rate, or any other indication of the strength or other characteristics of signals provided from the master device to respective slave devices. The master device, or other computing device, may also determine a device type or other device characteristics, such as coexistence characteristics, associated with one or more of the slave devices. For example, device characteristics may include hardware or software components associated with the audio device. Coexistence characteristics may include a communication status of a device, such as a device's current or previous use of Bluetooth or Zig-Bee communication protocols. A data structure, such as a table or database, that associates particular RSSI or other signal quality measurements with corresponding physical data rates may be used to determine the initial physical data rate used by the master device. In some implementations, different data structures may be used for each slave device depending on the device type or other characteristics of the device. For example, a data structure for a first type of audio device may include a look-up table that associates particular ranges of RSSI values with particular physical data rates. The data structure for a second type of audio device may include a different look-up table that associates different RSSI values with different physical data rates. After the master device, or other computing device, has determined a subset of physical data rates that correspond to each device type and signal quality measurement determined from the slave devices, the minimum physical data rate from the subset may be used as the initial physical data rate. In other implementations, a slave device may provide an indication of a corresponding physical data rate, and use of a data structure to determine the corresponding physical data rate based on RSSI values or other signal quality data may be omitted.

While the master device provides audio data to the slave devices, periodically (e.g., every 20 milliseconds, or another time period), the master device or another computing device may determine data from the slave devices. In one example implementation, the master device may provide audio data to the slave devices via a multicast transmission, and the slave devices may provide a response to the master device via unicast communication links. Data received from a particular slave device may include a request for retransmission of one or more audio data packets. For example, a particular slave device may have failed to receive one or more data packets, or one or more data packets may have become corrupted due to noise or other characteristics of the audio devices or network. The particular slave device may request retransmission of any data packets that were not properly received or able to be processed by the slave device. The data from the slave device may also include a packet error rate (PER) indicative of a count or percentage of data packets that the particular slave device was unable to receive or process. In other implementations, the master device, or another computing device in communication therewith, may determine the PER value for one or more of the slave devices based on the requests for retransmission received from the slave device(s). In some implementations, the data from the particular slave device may also include one or more signal quality measurements, such as a RSSI value associated with communication from the master device.

Based on the data received from the slave devices, the master device may modify the physical data rate used to provide the audio data to the slave devices. For example, the master device, or another computing device in communication therewith, may determine an individual PER value for each slave device that receives audio data from the master device. In some implementations, the master device, or another computing device, may determine an individual moving average or other mathematical function (e.g., mean, mode, or median) associated with the individual PER values determined from each slave device. For example, the master device may determine the average of a selected number of previous PER values received from a particular slave device, such as the previous ten values. In some implementations, the average value may be weighted, such as by providing a greater weight to values that were received more recently than the weight provided to values that were received less recently. In implementations where RSSI values or other signal quality measurements are received from the slave devices, the master device, or another computing device, may also determine a moving average or other mathematical function associated with the signal quality measurement(s). The master device, or another computing device in communication therewith, may also determine a cumulative packet error rate (PER) value indicative of a total count or percentage of data packets for which requests for retransmission were received from any slave device. For example, a master device transmitting audio data to three slave devices may receive data from each slave device indicating that ten percent of the data packets were not properly received or processed by each slave device. If each slave device failed to receive or process the same subset of data packets, then the cumulative PER value would be ten percent. However, if each slave device failed to receive or process different respective subsets of the data packets, then the cumulative PER value may be as large as thirty percent.

If the PER value, or in some implementations, a moving average determined from multiple PER values, for an individual slave device exceeds a threshold maximum individual packet error rate value, this may indicate that the current physical data rate used by the master device is too high to reliably provide audio data to the individual slave device. In such a case, the physical data rate used by the master device may be decreased. Similarly, if the cumulative PER value exceeds a threshold maximum cumulative packet error rate value, this may indicate the current physical data rate used by the master device is too high to reliably provide the audio data to the audio group. In such a case, the physical data rate used by the master device may be decreased. If the PER value, or a moving average determined from multiple PER values, for an individual slave device is less than a threshold minimum value, this may indicate that a higher physical data rate may possibly be used by the master device without increasing the PER for the slave device beyond the threshold maximum PER value. In such a case, the physical data rate used by the master device may be increased. If the individual PER values for each slave device are greater than the threshold minimum value and less than the threshold maximum PER value, and the cumulative PER value is less than the corresponding threshold maximum cumulative PER value, the current physical data rate used by the master device may be maintained, and additional data may continue to be periodically received from the slave devices. The threshold maximum value and the threshold minimum value for an individual PER may define a threshold range of individual packet rates. For example, if an individual PER value deviates from the threshold range of individual packet error rates, such as by exceeding the threshold maximum value or falling below the threshold minimum value, the physical data rate for the transmission of audio data may be changed.

In some implementations, the amount by which the physical data rate is increased or decreased may be determined based in part on the data structure used to determine the initial physical data rate. For example, the data structure may include a look-up table that associates signal quality values with physical data rates. If it is determined that the current physical data rate is too high to reliably provide the audio data, the physical data rate may be decreased from a current value to a lower value located in an adjacent row or column of the look-up table. If it is determined that the current physical data rate is lower than necessary to reliably provide the audio data, the physical data rate may be increased from a current value to a higher value located in an adjacent row or column of the look-up table. In other implementations the physical data rate may be increased or decreased to values located more than one row or column away from the current physical data rate. For example, if a PER value deviates from a maximum threshold or a minimum threshold by more than a threshold quantity, the current physical data rate may be changed to a value located two or more rows or columns away from the current physical data rate in the look-up table.

In other implementations, the amount by which the physical data rate is increased or decreased may be determined based on one or more signal quality values determined from one or more of the slave devices. For example, if the PER value determined from a particular slave device deviates from the corresponding threshold minimum or threshold maximum value, the RSSI value or other signal quality measurement determined from the particular slave device may be used to determine the modified physical data rate. For example, the data structure used to determine the initial physical data rate may associate signal quality values with corresponding physical data rate values. The current physical data rate used by the master device may be increased or decreased to the data rate indicated in the data structure that corresponds to the determined signal quality value(s) from the particular slave device.

In some implementations, if the individual PER value for a particular slave device, or the cumulative PER value, exceeds corresponding a critical threshold value, the physical data rate used by the master device may be immediately decreased to a minimum rate. For example, if a user moves an audio device to a different location, a network is affected by noise or other devices, or other conditions significantly affect the ability to reliably provide audio data to slave devices, this may result in a large increase in the PER values for one or more slave devices. Reduction of the physical data rate to a minimum value that is usable by the slave devices may prevent the transmission of audio data from failing. If the current physical data rate is at a minimum value, and the individual PER value for a slave device or the cumulative PER value exceeds a corresponding threshold, a notification may be generated that indicates one or more of a failure of the audio transmission, the particular slave device for which the PER value exceeds the threshold, an explanation of the exceeded threshold, and so forth.

FIG. 1 depicts an implementation of a system 100 for determining a physical data rate for transmission of audio data 102 from a master device 104 to one or more slave devices 106. In the example system 100 of FIG. 1, the master device 104 and the slave devices 106 are shown as audio devices, such as networked speakers. The master device 104 is shown in communication with an access point 108. For example, the master device 104 and slave devices 106 may communicate using a Wi-Fi network one or more other types of networks or protocols including, without limitation, Ethernet, Wi-Fi Direct, Bluetooth, Bluetooth Low Energy, Zig-Bee, Z-Wave, 3G, 4G, LTE, and so forth. While FIG. 1 depicts a single access point 108 in communication with the master device 104, in other implementations, the master device 104 may be in communication with multiple access points 108. Additionally, while the master device 104 and slave devices 106 are depicted as speakers, in other implementations, the master device 104 and slave devices 106 may include any type of computing device capable of generating an audio output including, without limitation, a smartphone, a tablet computer, a personal computer, a wearable computer, an automotive computer, a television, and so forth. Further, while FIG. 1 depicts three example slave devices 106, other implementations may include any number of slave devices 106. Also, while implementations described herein may reference audio devices and generation of a synchronized audio output, other implementations may be used to modify data rates associated with the transmission of other types of data, such as image data or video data.

To generate an audio output, the master device 104 may receive audio data 102 from a remote data source, such as one or more content servers 110 or another type of computing device. For example, responsive to a command to generate an output using particular audio data 102, the master device 104 may provide a request for the particular audio data 102 to the content server(s) 110, responsive to which the content server(s) 110 may provide the audio data 102 to the master device 104 via the access point(s) 108. In other implementations, the master device 104 may receive the audio data 102 from a local data source, such as a computing device in communication with the master device 104 via a Wi-Fi or Bluetooth communication link or data storage associated with the master device 104, itself. The master device 104 may provide the audio data 102 to one or more of the slave devices 106 via one or more multicast transmissions 112. Use of a multicast transmission 112 may enable a single copy of the audio data 102 to be provided to multiple slave devices 106, rather than providing individual copies of the audio data 102 to individual slave devices 106 via the access point(s) 108. In other implementations, the master device 104 may provide the audio data 102 to one or more of the slave devices 106 via the access point(s) 108. For example, particular slave devices 106 may be unable to receive the audio data 102 via a multicast transmission 112. Continuing the example, a slave device 106 may lack a multicast receiver, may be damaged or malfunctioning in a manner that prevents receipt of multicast transmissions 112, or may be positioned at a location relative to the master device 104 that prevents the slave device 106 from receiving multicast transmissions 112 from the master device 104.

The master device 104 may provide the audio data 102 to the slave devices 106 at a particular physical data rate. As described previously, the initial physical data rate at which the audio data 102 is provided may be determined based on characteristics of the slave devices 106, such as an indication of the device types associated with the slave devices 106, signal quality values such as RSSI measurements associated with communications received from the master device 104, and so forth. In other implementations, the initial physical data rate used by the master device 104 may include a default initial data rate, such as the minimum physical data rate supported by the master device 104 and each of the slave devices 106.

At last a portion of the slave devices 106 may provide response data 114 to the master device 104. FIG. 1 depicts the slave devices 106 providing response data 114 to the master device 104 via a unicast transmission, such as through use of a Wi-Fi Direct protocol. In other implementations, the slave devices 106 may provide the response data 114 to the master device 104 using other means of communication, such as Bluetooth protocols. The response data 114 may include a request for retransmission of one or more data packets of the audio data 102. For example, a particular slave device 106 may have failed to receive one or more particular data packets, or the particular data packet(s) may have become corrupted or otherwise unable to be processed due to characteristics of the network or one or more of the audio devices. The response data 114 from each slave device 106 may also indicate a PER value associated with the respective slave device 106. In other implementations, the master device 104 or another computing device in communication therewith may determine a PER value for each slave device 106 based on the requests for retransmission. In some implementations, the response data 114 may also indicate a signal quality measurement associated with the respective slave device 106, such as a RSSI value associated with the multicast transmission 112 received from the master device 104. In some cases, the response data 114 may also indicate one or more characteristics of the respective slave device 106, such as an indication of a device type or an indication of particular hardware, software, or configurations associated with the slave device 106. In other cases, the master device 104 may access existing device data indicative of the characteristics of the slave devices 106.

Based on the response data 114 received from at least a subset of the slave devices 106, the master device 104 may modify the physical data rate used to transmit the audio data 102 via the multicast transmission 112. For example, if the PER value associated with a particular slave device 106 exceeds a threshold maximum PER value, the physical data rate used by the master device 104 may be reduced. If the PER value associated with a particular slave device 106 is less than a threshold minimum PER value, the physical data rate may be increased. In some implementations, the master device 104, or another computing device in communication therewith, may determine a cumulative PER value based on a total count or percentage of data packets for which a slave device 106 requested retransmission. If the cumulative PER value exceeds a corresponding threshold maximum cumulative PER value, the physical data rate used by the master device 104 may be reduced. Additionally, if the PER value of a particular slave device 106 or the cumulative PER value exceeds a corresponding critical threshold value, the physical data rate used by the master device 104 may be reduced to the minimum rate supported by the master device 104 and the slave devices 106. If a PER value exceeds a threshold, but the master device 104 is unable to reduce the physical data rate, such as at times when the current physical data rate is the minimum supported physical data rate, a notification may be generated indicating a possible failure of the group of audio devices to generate an output. In some implementations, the notification may indicate one or more particular slave devices 106 having PER values that exceed a corresponding threshold value.

Figure 2:
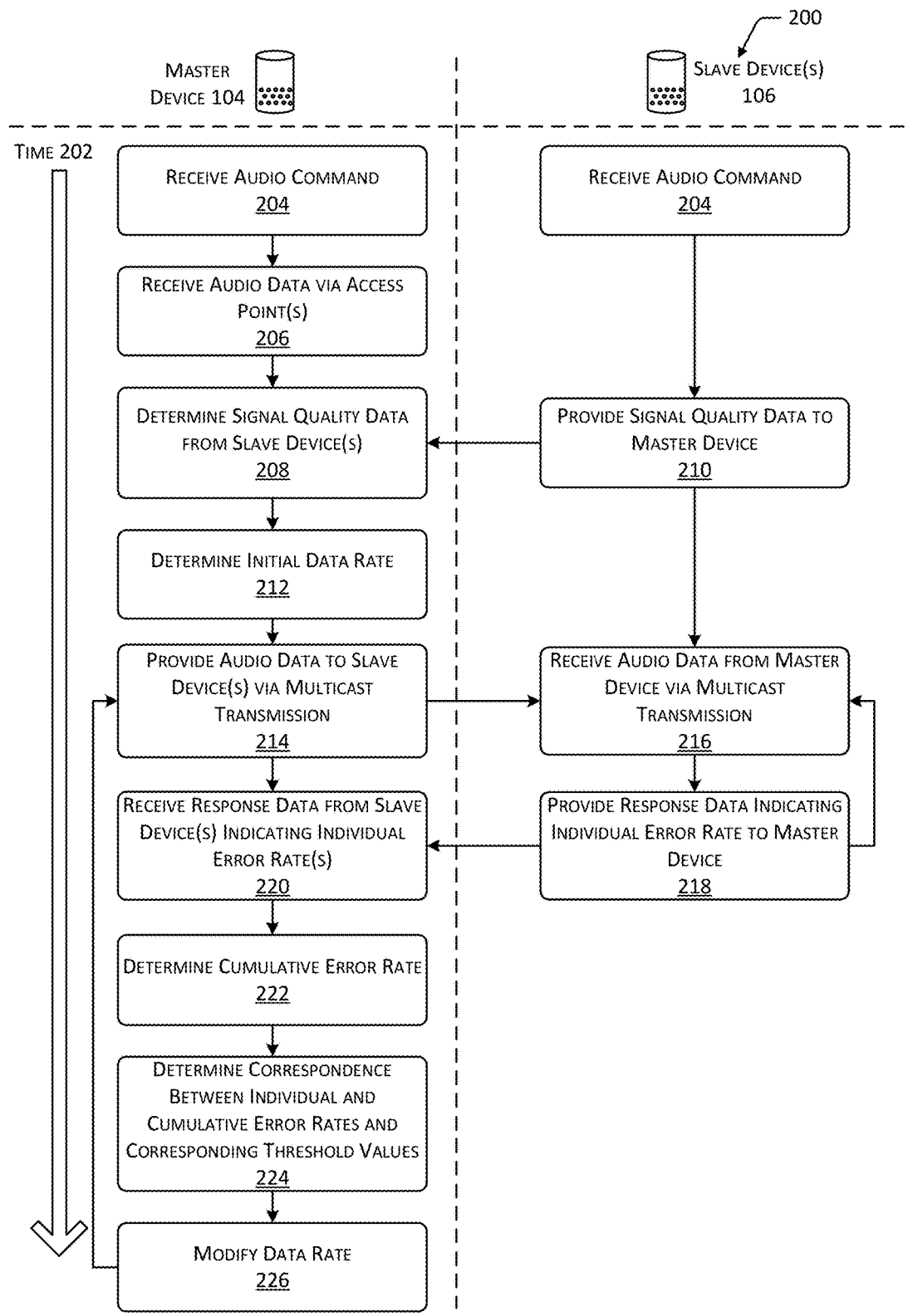
FIG. 2 is a flow diagram illustrating one possible implementation of interactions between audio devices to determine data rates for distribution of audio data.

FIG. 2 is a flow diagram 200 illustrating one possible implementation of interactions between audio devices to determine data rates for distribution of audio data 102. The vertical arrow on the left side of the figure illustrates the passage of time 202. At block 204, the master device 104 may receive an audio command. For example, an external device or one of the audio devices may be used to provide a command to the master device 104 to initiate an audio output, such as through use of an audio application. The command may include an indication of particular audio devices to be used to provide the output, particular audio data 102, a particular audio application, and so forth. In some implementations, the command may also be provided to one or more slave devices 106. The command may be provided to the slave devices 106 directly from the external device or other source of the command, or the command may be provided to one or more of the slave devices 106 from the master device 104 or from another slave device 106, such as via a connection to the access point(s) 108 or via a multicast transmission 112. In other implementations, the slave devices 106 may not receive the command, but may be indicated in the command provided to the master device 104, which may in turn provide audio data 102 to the slave devices 106.

Based on the command, at block 206, the master device 104 may receive the audio data 102 via the access point(s) 108. For example, the master device 104 may provide a request for the audio data 102 to a content server 110 or other external device. In other implementations, an external source may provide the audio data 102 to the master device 104 in the absence of a request. In still other implementations, the command may include the audio data 102, or the master device 104 may access a local data source that includes the audio data 102.

At block 208, the master device 104 may determine signal quality data from one or more of the slave devices 106. For example, the master device 104 may provide a request to one or more of the slave devices 106 via the access point(s) 108, a unicast transmission, or a multicast transmission 112, responsive to which the slave device(s) 106 may provide the signal quality data. In other implementations, the slave device(s) 106 may provide signal quality data to the master device 104 in the absence of a request, such as responsive to the command. Block 210 illustrates the slave device(s) 106 providing the signal quality data to the master device 104. The signal quality data may include a RSSI value or other indications of signal quality, such as a SNR value, a PER value, and so forth. While FIG. 2 depicts block 208 subsequent to block 206, in other implementations, the master device 104 may determine single quality data from the slave device(s) 106 prior to or concurrent with receipt of the audio data 102.

At block 212, the master device 104 may determine an initial data rate to be used when transmitting audio data 102 to the slave device(s) 106, such as via a multicast transmission 112. In some implementations, the initial data rate may be determined based on correspondence between the signal quality data determined from the slave device(s) 106 and a data structure associates signal quality values with corresponding data rates. For example, the data structure may include a look-up table that associates RSSI values with corresponding physical data rate values. In other implementations, another computing device, such as one of the slave devices 106, an external device in communication with the master device 104, one or more servers, and so forth may determine one or more of the signal quality data or the corresponding initial data rate, and may provide an indication of the signal quality data or initial data rate to the master device 104.

At block 214, the master device 104 may provide the audio data 102 to the slave device(s) 106 via a multicast transmission 112. At block 216, one or more of the slave devices 106 may receive the audio data 102 from the master device 104. The audio data 102 may be provided using the initial data rate determined at block 212, and subsequently at a modified data rate determined based on response data 114, as described below and with regard to FIG. 1. At block 218, one or more of the slave devices 106 may provide response data 114 to the master device 104. The response data 114 from respective slave devices 106 may indicate respective error rates associated with communication from the master device 104 to the respective slave device 106. In other implementations, the response data 114 may indicate a request for retransmission associated with one or more data packets of the audio data 102, and the master device 104, or another computing device in communication therewith, may determine error rate(s) for the slave device(s) 106 based on the requests for retransmission. At block 220, the master device 104 may receive the response data 114 from the slave device(s) 106 indicating individual error rate(s).

At block 222, the master device 104, or another computing device in communication therewith, may determine a cumulative error rate. The cumulative error rate may be based in part on the response data 114 determined from the slave device(s) 106. For example, the response data 114 may indicate particular packets that were not successfully received or processed by particular slave devices 106 and individual error rates associated with one or more of the slave devices 106. The cumulative error rate may indicate a total count or percentage of total data packets not successfully received or processed by the slave devices 106.

At block 224, the master device 104, or another computing device in communication therewith, may determine correspondence between the individual error rates determined from respective slave devices 106 and corresponding threshold values. The master device 104, or another computing device, may also determine correspondence between the cumulative error rate and a corresponding threshold maximum cumulative packet error rate. At block 226, the master device 104 may modify the data rate based on the determination made in block 224, then continue to provide audio data 102 using the modified data rate. For example, if the individual error rate for one or more of the slave devices 106, or the cumulative error rate, exceeds a threshold maximum error rate value, the data rate may be decreased. If the individual error rate for one or more of the slave devices 106 is less than a threshold minimum value, the data rate may be increased. If the individual error rate for one or more of the slave devices 106, or the cumulative error rate, exceeds a critical threshold value, the data rate may be reduced to a minimum value that may be used by the master device 104 and the slave devices 106.

Figure 3:
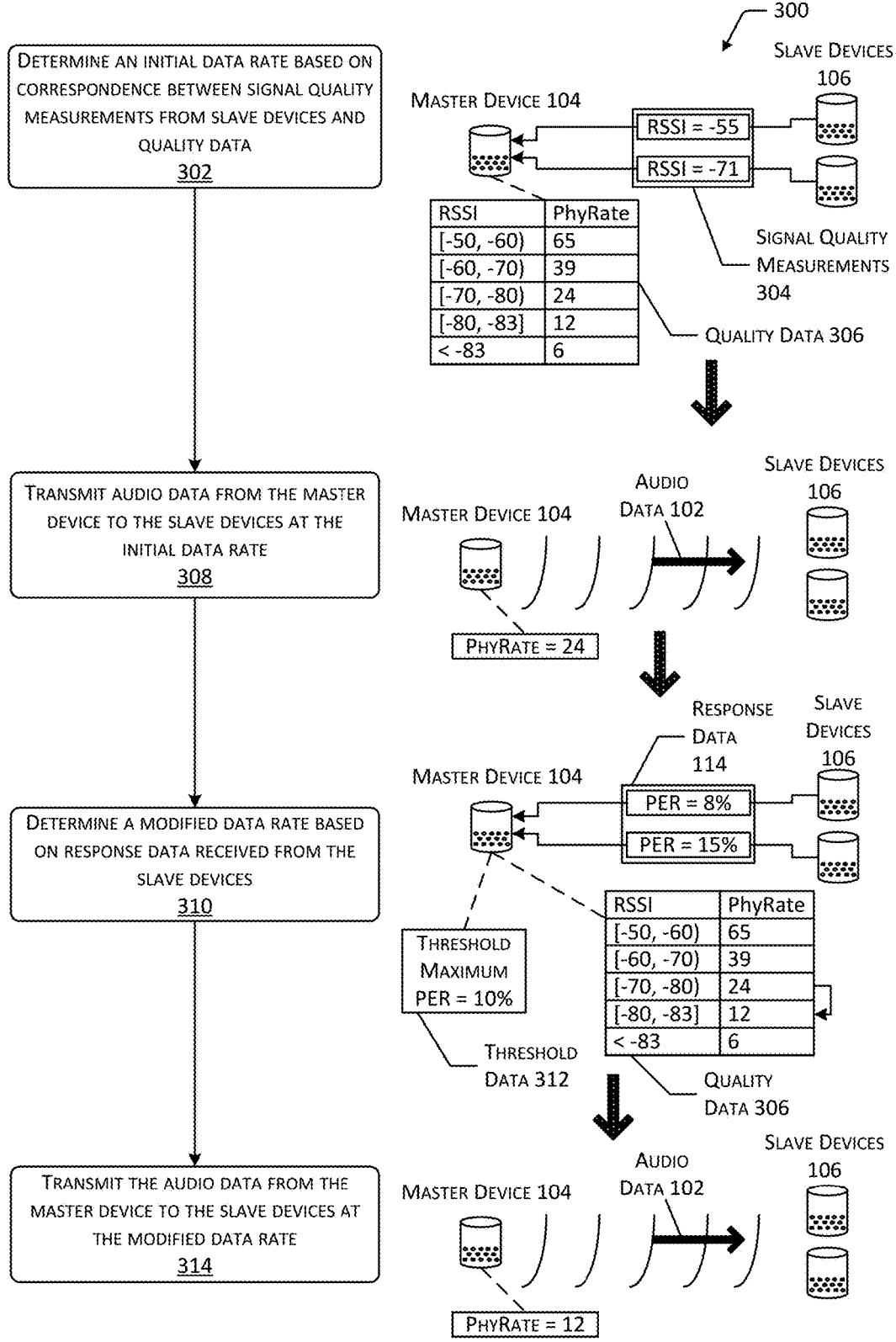
FIG. 3 depicts a scenario illustrating a method for determining a data rate for transmission of audio data based on data received from slave devices.

FIG. 3 depicts a scenario 300 illustrating a method for determining a data rate for transmission of audio data 102 based on data received from slave devices 106. At 302, an initial data rate may be determined based on correspondence between signal quality measurements 304 from slave devices 106 and quality data 306 that associates particular signal quality measurements 304 or ranges of signal quality measurements 304 with corresponding data rates. The signal quality measurements 304 may include one or more indications of signal strength or other characteristics of signals transmitted from the master device 104 to the slave devices 106. For example, signal quality measurements 304 may include RSSI values, SNR values, PER values, MCS values or other indicia of signal quality. Continuing the example, FIG. 3 depicts the signal quality measurements 304 received from two slave devices 106 including RSSI values of −55 and −71. The quality data 306 may include a table, database, or another type of data structure that associates signal quality measurements 304 with corresponding data rates. For example, FIG. 3 depicts the quality data 306 including a table that associates ranges of RSSI values with corresponding physical data rates. Based on the signal quality measurements 304 determined from the slave devices 106, the corresponding data rate indicated in the quality data 306 may be determined. In cases where multiple slave devices provide signal quality measurements 304 that correspond to different data rates, the minimum data rate of the determined set of data rates may be used to facilitate the reliability of transmissions from the master device 104 to the slave devices 106. For example, FIG. 3 depicts a physical data rate of 65 that corresponds to the RSSI value of −55, and a physical data rate of 24 that corresponds to the RSSI value of −71. In such a case, the minimum data rate of the determined set of data rates would be 24. While FIG. 3 depicts a single example of a quality data 306, in other implementations, different quality data 306 may correspond to different slave devices 106. For example, a particular table may correspond to a particular device type, while a different data structure may correspond to a different device type. In such cases, the data rate that corresponds to the signal quality measurement 304 of a particular slave device 106 may be determined using the quality data 306 that corresponds to that particular slave device 106. In cases where multiple data rates are determined in this manner, the minimum of the determined data rates may be used as the initial data rate.

At 308, audio data 102 may be transmitted from the master device 104 to the slave devices 106 at the initial data rate. For example, the master device 104 may provide the audio data 102 to multiple slave devices 106 via a multicast transmission 112.

At 310, a modified data rate may be determined based on response data 114 received from the slave devices 106. For example, the response data 114 received from each slave device 106 may include an indication of a respective error rate associated with the slave device 106. Continuing the example, FIG. 3 depicts the response data 114 from two slave devices 106 indicating packet error rates of 8% and 15%, respectively. In other implementations, the master device 104, or another computing device in communication therewith, may determine the packet error rates for the slave devices 106 based on requests for retransmission associated with the response data 114. Correspondence between the error rates and threshold data 312 may determine whether the data rate for transmission of the audio data 102 may be increased, decreased, or unchanged. For example, if a determined error rate exceeds a maximum threshold value, the data rate may be decreased. If the error rate is less than a minimum threshold value, the data rate may be increased. If the error rate is greater than the minimum threshold value but less than the maximum threshold value, the data rate may remain unchanged. In the example shown in FIG. 3, one of the error rates determined from the slave devices 106 (e.g., 15%) exceeds a threshold maximum error rate value of 10%. Due to the error rate exceeding the threshold maximum value, the data rate may be decreased. In some implementations, the amount by which the data rate is increased or decreased may be determined based on the quality data 306. For example, responsive to a determination that an error rate for a slave device 106 exceeds a corresponding threshold value, the data rate may be modified from an initial value to a value located one row below the initial value in a table. In other implementations, the data rate may be changed to a value located two or more rows away from the current value based on the amount by which a determined error rate deviates from the corresponding threshold value. At 314, the audio data 102 may be transmitted from the master device to the slave devices 106 at the modified data rate.

Figure 4:
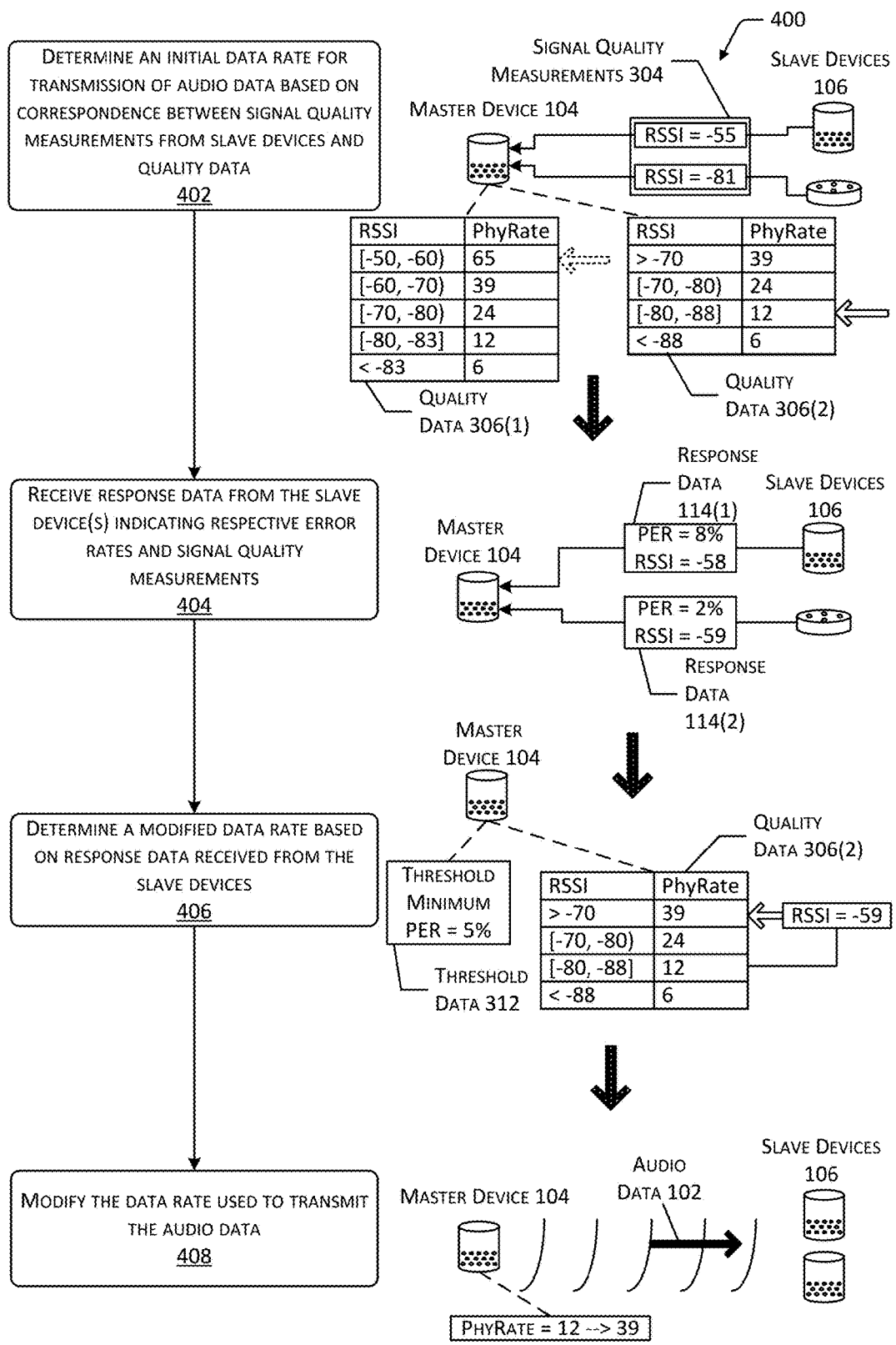
FIG. 4 depicts a scenario illustrating a method for modifying a data rate used to transmit audio data based on signal quality measurements.

FIG. 4 depicts a scenario 400 illustrating a method for modifying a data rate used to transmit audio data 102 based on signal quality measurements 304. At 402 an initial data rate may be determined for transmission of audio data 102. The initial data rate may be based on correspondence between signal quality measurements 304 from slave devices 106 and quality data 306 that associate signal quality measurements 304 with data rates. For example, FIG. 4 depicts two slave devices 106 providing corresponding RSSI values to a master device 104. A first slave device 106 indicates a RSSI value of −55 for communications received from the master device 104, and a second slave device 106 indicates a RSSI value of −81. As described with regard to FIG. 3, in some implementations, the quality data 306 may include a table, database, or other data structure that associates RSSI values or other signal quality measurements 304 with corresponding data rates. In some cases, different slave devices 106 may be associated with different quality data 306. For example, a first slave device 106 may include a first type of device having particular hardware, software, or other characteristics that would facilitate use of particular data rates at particular RSSI values. A second slave device 106 of a different type than the first slave device 106 may have characteristics that would facilitate use of different data rates at different ranges of RSSI values. Continuing the example, FIG. 4 depicts first quality data 306(1) that associates a first set of RSSI values with corresponding physical data rates, and second quality data 306(2) that associates a second set of RSSI values with corresponding physical data rates. In some cases, certain quality data 306 may include data rates not included in other quality data 306. For example, a particular type of audio device may not support certain data rates. Continuing the example, the first quality data 306(1) includes a row indicating a physical data rate of 65, while the second quality data 306(2) lacks a row indicating a physical data rate of 65. This may indicate that a physical data rate of 65 is not supported by the second slave device 106.

In the depicted example, a first data rate may be determined based on the first quality data 306(1) and the signal quality measurement 304 received from the first slave device 106. A second data rate may be determined based on the second quality data 306(2) and the signal quality measurement 304 received from the second slave device 106. To facilitate reliability of communications from the master device 104, the minimum of the first data rate and the second data rate may be used as the initial data rate.

At 404, response data 114 from the slave devices 106 may be received, responsive to transmission of audio data 102 from the master device 104. The response data 114 may indicate respective error rates and signal quality measurements 304 associated with the communications from the master device 104. For example, first response data 114(1) from a first slave device 106 may include a first packet error rate (e.g., 8%) and a first RSSI value (e.g. −58). Second response data 114(2) from a second slave device 106 may include a second packet error rate (e.g., 2%) and a second RSSI value (e.g., −59). At least a portion of the response data 114 may be used to determine a modification to the initial data rate, as described below. In other implementations, the response data 114 from the slave devices 106 may include requests for retransmission of one or more data packets, and the master device 104 or another computing device in communication therewith may determine the packet error rates associated with the slave devices 106.

At 406, a modified data rate may be determined based on the response data 114 received from the slave devices 106. Specifically, correspondence between the error rates determined from the response data 114 and corresponding threshold values may be determined. A deviation between an error rate and a corresponding threshold value may indicate that the current data rate should be changed. For example, if an error rate for a particular slave device 106 exceeds a threshold maximum error rate value, the data rate may be decreased. Conversely, if the error rate for a particular slave device 106 is less than a threshold minimum value, as depicted in FIG. 4, the data rate may be increased. In some implementations, the modified data rate may be determined based on one or more signal quality measurements 304 determined from the response data 114. For example, the response data 114(2) received from the particular slave device 106 may indicate a RSSI value associated with communications received from the master device 104. Correspondence between the RSSI value and the quality data 306(2) associated with the particular slave device 106 may be used to determine the data rate that corresponds to the RSSI value. The corresponding data rate may be used as the modified data rate for subsequent transmissions by the master device 104. At 408, the data rate used to transmit the audio data 102 may be modified, based on the modified data rate determined at 406.

Figure 5:
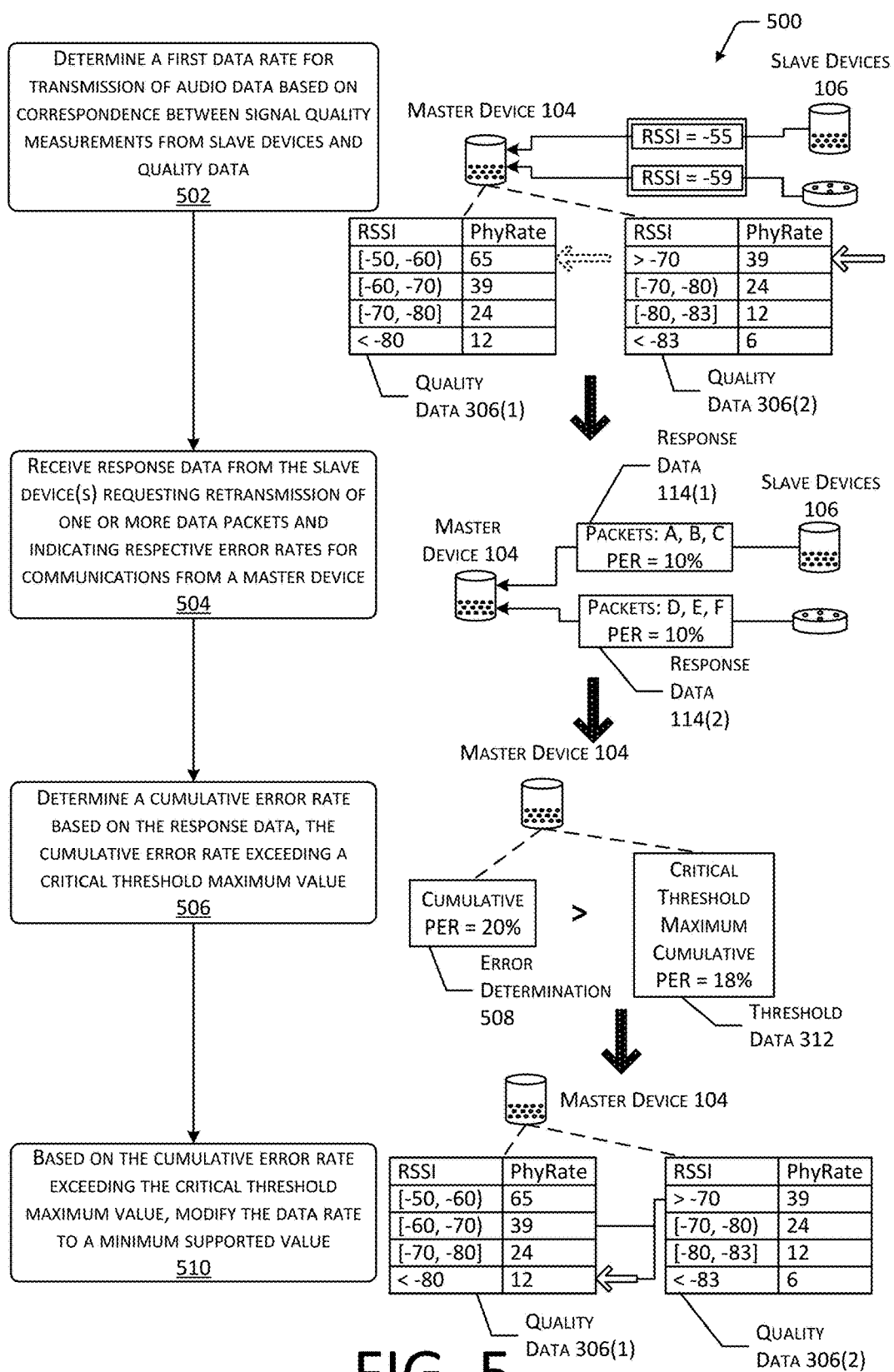
FIG. 5 depicts a scenario illustrating a method for reducing a data rate based on one or more critical threshold values.

FIG. 5 depicts a scenario 500 illustrating a method for reducing a data rate based on one or more critical threshold values. At 502, a first data rate for transmission of audio data 102 may be determined based on correspondence between signal quality measurements 304 from slave devices 106 and quality data 306 that associates signal quality measurements 304 with corresponding quality data 306. As described with regard to FIGS. 3 and 4, signal quality measurements 304 may include RSSI values or other indications of the strength or various characteristics of the signals received by a slave device 106 from a master device 104. The quality data 306 may include a table, database, or other type of data structure that associates various signal quality measurements 304 with corresponding data rates. In some cases, different quality data 306 may be associated with different slave devices 106. For example, first quality data 306(1) may be associated with a first slave device 106, and second quality data 306(2) may be associated with a second slave device 106. If different data rates are determined for different slave devices 106, the minimum data rate that is determined may be used as the first data rate.

At 504, response data 114 from the slave devices 106 may be received. The response data 114 may request retransmission of one or more data packets and indicate responsive error rates for each slave device 106, associated with communications from the master device 104. For example, first response data 114(1) from a first slave device 106 may indicate a first set of data packets and a first packet error rate. Second response data 114(2) from a second slave device 106 may indicate a second set of data packets and a second packet error rate. In other implementations, the master device 104 or another computing device in association therewith may determine the packet error rates associated with the slave devices 106 based on sets of data packets indicated in the response data 114. In the example depicted in FIG. 5, the packets indicated in the first response data 114(1) may differ from those indicated in the second response data 114(2).

At 506, a cumulative error rate may be determined based on the response data 114. In the example depicted in FIG. 5, the cumulative error rate may exceed a corresponding threshold critical cumulative error rate. For example, FIG. 5 depicts individual packet error rates of 10% for two slave devices 106. However, the particular data packets for which retransmission was requested by each slave device 106 differ. Therefore, the cumulative error rate, shown as an error determination 508 in FIG. 5, is 20%. Correspondence between the error determination 508 and threshold data 312 indicative of a threshold critical cumulative PER value may indicate that the cumulative PER value exceeds the corresponding threshold value.

At 510, based on the cumulative error rate exceeding the threshold critical cumulative error rate, the data rate used by the master device 104 to provide audio data 102 to the slave devices 106 may be reduced to a minimum value supported by the master device 104 and the slave devices 106. For example, based on the quality data 306 associated with the slave devices 106, the lowest physical data rate that is included in each quality data 306 is 12. Therefore, at 510, the data rate may be modified to 12.

While FIG. 5 depicts the cumulative error rate exceeding the threshold critical cumulative error rate, in other implementations, an individual error rate associated with one of the slave devices 106 may exceed a corresponding threshold critical individual error rate. Responsive to the individual error rate exceeding the corresponding threshold critical individual error rate, the data rate used by the master device 104 may be reduced to the minimum data rate supported by each audio device.

In some cases, the first data rate may be equal to the minimum data rate. For example, based on the signal quality measurements 304 determined at 502, the first data rate used by the master device 104 may be the minimum data rate supported by the audio devices. As another example, the data rate used by the master device 104 may be decreased to the minimum supported data rate subsequent to performance of the methods depicted in FIG. 3 or FIG. 5. Then, if an error rate associated with a slave device 106, or the cumulative error rate, continues to exceed a critical threshold maximum value, the data rate cannot be decreased any farther. In such a case, a notification may be generated indicating a failure of the audio output. In some implementations, the notification may indicate one or more particular slave devices 106 having an error rate that exceeds a corresponding threshold value. For example, a user or a module associated with the master device 104 or another computing device in communication therewith may modify the audio devices included in a group for generating output based on the notification.

Figure 6:
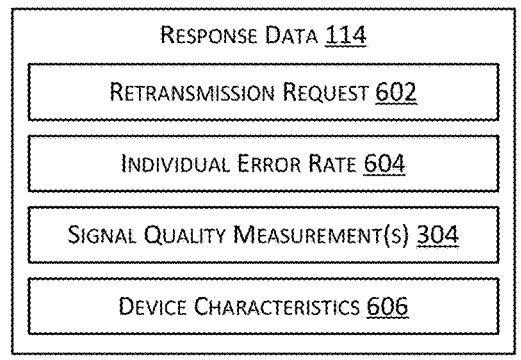
FIG. 6 depicts block diagrams illustrating example implementations of response data and threshold data.
Figure 6:
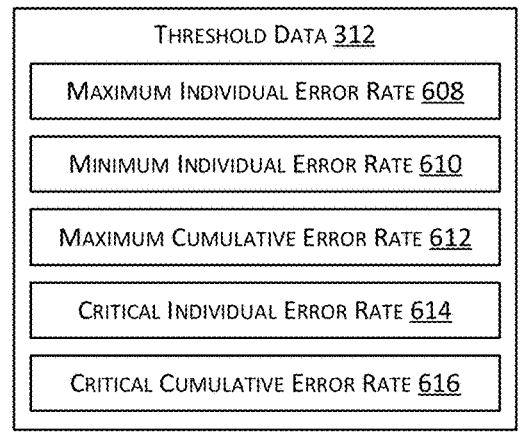

FIG. 6 depicts block diagrams 600 illustrating example implementations of response data 114 and threshold data 312. Response data 114 may include data provided by one or more slave devices 106 to the master device 104 or another computing device. In some implementations, a slave device 106 may provide response data 114 to the master device 104 via one or more unicast transmissions. The response data 114 may indicate one or more characteristics of a signal received by the slave device 106 from the master device 104. For example, a slave device 106 may generate response data 114 and provide the response data 114 to the master device 104 responsive to receipt of audio data 102 from the master device 104 via a multicast transmission 112.

The response data 114 may include one or more retransmission requests 602. Retransmission requests 602 may include an indication of one or more data packets of audio data 102. For example, the audio data 102 provided by the master device 104 may include or be preceded by an indication of one or more data packets to be included in the audio data 102. If the master device 104 fails to transmit a particular data packet, if the slave device 106 fails to receive the data packet, or if the data packet becomes corrupted, affected by noise, or otherwise unable to be processed by the slave device 106, the retransmission request 602 may indicate that particular data packet. For example, the slave device 106 may determine one or more deviations between the data packets of audio data 102 that are received and processed and the data packets indicated as included in the audio data 102. The retransmission request 602 may indicate at least a subset of the data packets associated with the deviation(s). The count or percentage of data packets associated with retransmission requests 602 may be used to determine individual error rates associated with particular slave devices 106, and may also be used to determine a cumulative error rate associated with a group of audio devices.

The response data 114 may also include an indication of an individual error rate 604 associated with the slave device 106 providing the response data 114. For example, a slave device 106 may determine a packet error rate indicative of a count or percentage of data packets not received or not processed by the slave device 106. Correspondence between the individual error rate 604 and the threshold data 312 may be used to determine whether the data rate used to provide audio data 102 to the corresponding slave device 106 will be increased, decreased, or remain unchanged.

In some implementations, the response data 114 may further include one or more signal quality measurements 304. For example, the response data 114 may include one or more RSSI values, SNR values, and so forth. As described with regard to FIGS. 2-5, signal quality measurements 304 may be used to determine an initial data rate for use transmitting audio data 102 to a slave device 106. In some implementations, signal quality measurements 304 may be used to determine a modified data rate for use. For example, correspondence between a particular signal quality measurement 304 received as response data 114 and quality data 306 that associates signal quality measurements 304 with respective data rates may be used to determine a data rate that corresponds to the particular signal quality measurement 304. The data rate that corresponds to the signal quality measurement 304 may be used as the modified data rate for transmitting the audio data 102.

In some implementations, the response data 114 may also include device characteristics 606. Device characteristics 606 may include an indication of hardware, software, or other characteristics of a particular slave device 106. For example, the device characteristics 606 may include an indication of a device type, such as an indication whether an audio device includes a particular type of networked speaker, a television, a smartphone, a tablet computer, or another type of computing device or audio output device. In some cases, the device characteristics 606 may indicate a type of wireless radio or antenna used by an audio device, particular communication links maintained by the audio device with other devices, audio applications executable by the audio device, audio data 102 stored in association with the audio device, and so forth. Device characteristics 606 may be used to determine data rates that may be supported by a particular audio device. For example, different quality data 306 may correspond to different particular devices or device types. Continuing the example, a first type of networked speaker may utilize particular data rates based on particular ranges of RSSI values, while a second type of networked speaker may utilize different data rates at different ranges of RSSI values. In some cases, the second type of networked speaker may support data rates that are not supported by the first type of speaker, or vice versa.

Threshold data 312 may include indications of particular values that may correspond to or deviate from one or more portions of the response data 114. Correspondence between the response data 114 and the threshold data 312 may be used to determine whether a data rate used to send audio data 102 may be increased, decreased, or remain unchanged.

For example, the threshold data 312 may include a maximum individual error rate 608. The maximum individual error rate 608 may indicate a maximum value that, if exceeded by the error rate for an individual slave device 106, may indicate that the current data rate used to transmit audio data to the slave device 106 is too high to reliably facilitate receipt and processing of the audio data 102. If the individual error rate 604 for a particular slave device 106 exceeds the threshold maximum individual error rate 608, the data rate used to transmit audio data 102 to the slave device 106 may be decreased. In some implementations, the maximum individual error rate 608 may include a default, preselected, or user-input value. In other implementations, the maximum individual error rate 608 may be determined based on previous error rates associated with communications between audio devices. For example, if communications associated with PER values greater than a particular PER value historically resulted in a failure to generate an audio output, the particular PER value may be used as a maximum individual error rate 608 for subsequent communications between audio devices.

The threshold data 312 may also include a minimum individual error rate 610. If the individual error rate 604 for a slave device 106 is less than the minimum individual error rate 610, this may indicate that the current data rate used to transmit audio data 102 to the slave device 106 may be increased without preventing successful receipt and processing of the audio data 102 by the slave device 106. If the individual error rate 604 for a particular slave device 106 is less than the minimum individual error rate 610, the data rate used to transmit audio data 102 to the slave device 106 may be increased. If the individual error rate 604 for each slave device 106 is greater than the minimum individual error rate 610 and less than the maximum individual error rate 608, the data rate used to provide the audio data 102 to the slave device 106 may remain unchanged. In some implementations, the minimum individual error rate 610 may include a default, preselected, or user-input value. In other implementations, the minimum individual error rate 610 may be determined based on previous error rates associated with communications between audio devices. For example, if communications associated with PER values less than a particular PER value did not result in a failure to generate an audio output, the particular PER value may be used as a minimum individual error rate 610 for subsequent communications.

In other implementations, the minimum individual error rate 610 may be omitted. For example, if an error rate associated with each slave device 106 does not exceed a corresponding maximum individual error rate 608, the data rate associated with the transmission of audio data 102 to the slave devices 106 may be increased without determining correspondence between the error rate(s) and a minimum individual error rate 610.

The threshold data 312 may further include a threshold maximum cumulative error rate 612. The threshold maximum cumulative error rate 612 may include a maximum value that, if exceeded by the cumulative error rate for transmission of audio data 102 to each of the slave devices 106, may indicate that the current data rate used to transmit audio data 102 to the slave devices 106 is too high to reliably facilitate receipt and processing of the audio data 102. If the cumulative error rate for transmission of the audio data 102 to each of the slave devices 106 is greater than the threshold maximum cumulative error rate 612, the data rate used to provide the audio data 102 to the slave devices 106 may be decreased.

The threshold data 312 may additionally include a threshold critical individual error rate 614 and a threshold critical cumulative error rate 616. As discussed with regard to FIG. 5, if an individual error rate 604 for a slave device 106 exceeds the threshold critical individual error rate 614, or if a cumulative error rate for transmission of audio data 102 to a group of slave devices 106 exceeds the threshold critical cumulative error rate 616, the data rate for transmission of the audio data 102 may be reduced to a minimum value supported by the audio devices.

Figure 7:
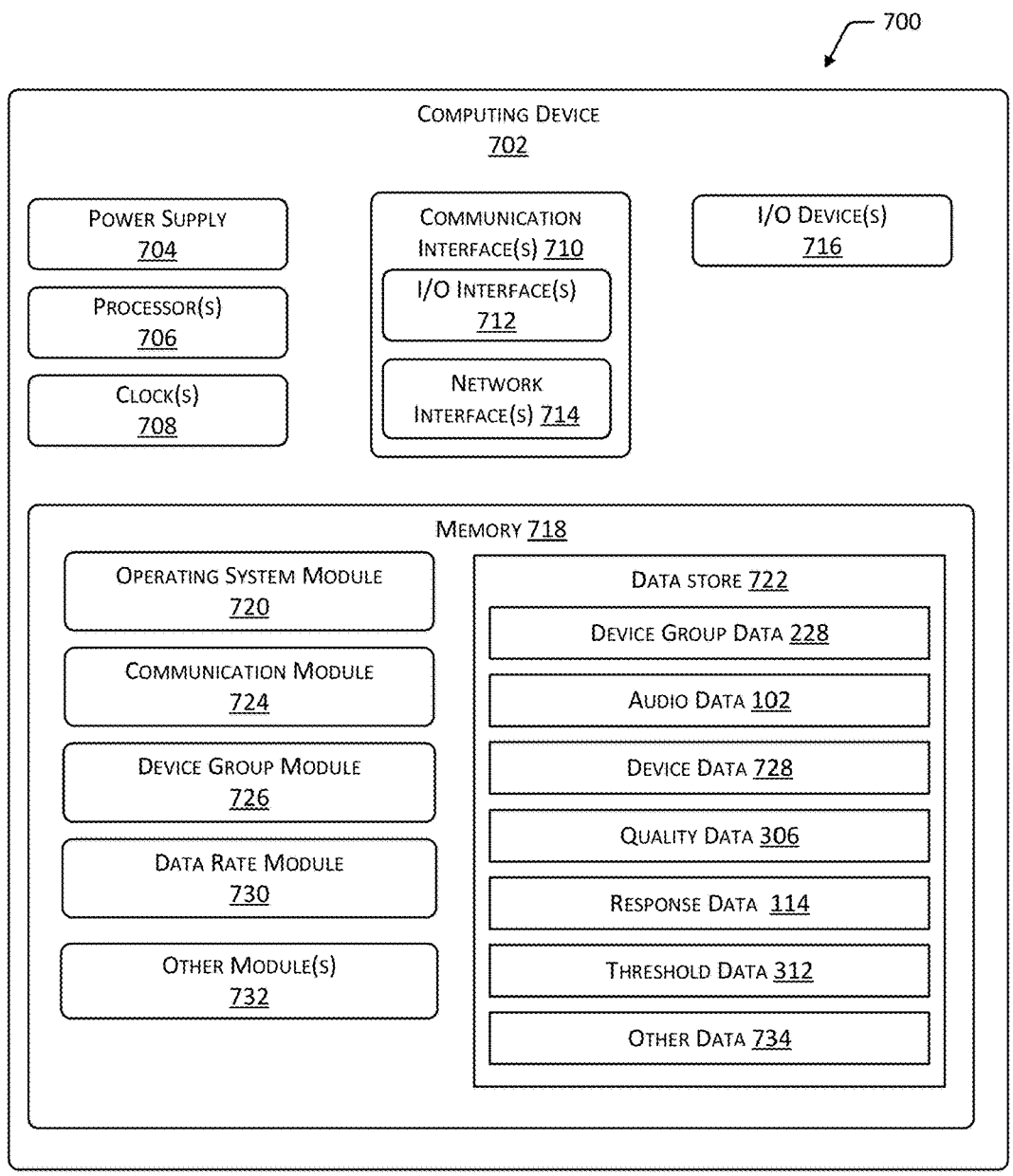
FIG. 7 is a block diagram depicting an implementation of a computing device within the scope of the present disclosure.

FIG. 7 is a block diagram 700 depicting an implementation of a computing device 702 within the scope of the present disclosure. The computing device 702 may include, without limitation, any of the devices depicted in FIG. 1, such as the master device 104, a slave device 106, a content server 110, or another computing device 702 in communication with one or more of the master device 104 or a slave device 106. Additionally, while FIG. 7 depicts a single example computing device 702, implementations described herein may be performed using multiple computing devices 702 that independently or collaboratively perform the functions described herein. For example, multiple audio devices or other computing devices 702 in communication therewith may perform the functions of the depicted computing device 702.

The computing device 702 may include one or more power supplies 704 configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, determine synchronization commands to control the timing of audio output, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with audio devices and other computing devices 702 or components thereof. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702 or with another computing device 702 in communication therewith. For example, I/O devices 716 may include touch sensors, keyboards, mouse devices, microphones, image sensors (e.g., cameras), scanners, displays, speakers, haptic devices, printers, motion sensors, location sensors, and so forth. In some implementations, I/O devices 716 may include multicast transmitters and receivers. The I/O devices 716 may be physically incorporated with a computing device 702 or may be externally placed.

The network interfaces 714 may be configured to provide communications between the computing device 702 and other devices, such as the I/O devices 716, routers, access points 108, and so forth. The network interfaces 714 may include devices configured to couple to one or more networks including local area networks (LANs), wireless LANs (WLANs), wide area networks (WANs), wireless WANs (WWANs), and so forth. For example, the network interfaces 714 may include computing devices 702 compatible with Ethernet, Wi-Fi, Wi-Fi Direct, Bluetooth, Bluetooth Low Energy, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 4, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 stored in the memory 718 may be configured to establish communications with audio devices, servers, external devices, or other computing devices 702.

The memory 718 may also store a device group module 726. The device group module 726 may receive audio commands indicative of particular audio devices, audio applications, audio data 102, and so forth and determine a group of audio devices to generate an audio output responsive to the command(s). For example, the device group module 726 may access device data 728, indicative of particular characteristics of audio devices, such as device identifiers, device types, device capabilities and functions, hardware and software components associated with audio devices, locations of audio devices, and so forth. Based on correspondence between an audio command and the device data 728, a group of audio devices may be determined. Example implementations for forming groups of audio devices are described in U.S. patent application Ser. Nos. 15/245,897 and 15/246,070, incorporated by reference previously.

The memory 718 may also include a data rate module 730. The data rate module 730 may determine data rates at which the computing device 702, or another computing device 702 in communication therewith, may provide audio data 102 to one or more slave devices 106, or other computing devices 702 in communication with the slave device(s) 106. For example, the data rate module 730 may determine an initial data rate at which audio data 102 may be provide based in part on signal quality measurements 304 received from the slave devices 106 and quality data 306 that associate particular signal quality measurements 304 or ranges of signal quality measurements 304 with corresponding data rates. Correspondence between the signal quality measurements 304 from each slave device 106 and the quality data 306 may determine multiple data rates. The initial data rate used to transmit the audio data 102 may include the minimum data rate of the set of determined data rates.

The data rate module 730 may also modify the data rate used to transmit audio data 102 based on response data 114 received from slave devices 106. For example, the response data 114 may indicate individual error rates 604 for respective slave devices 106. The data rate module 730 may determine correspondence between the individual error rates 604 and threshold data 312. If an individual error rate 604 is greater than a maximum individual error rate 608 indicated in the threshold data 312, the data rate may be decreased. If the individual error rate 604 is less than a minimum individual error rate 610 indicated in the threshold data 312, the data rate may be increased. If the individual error rate 604 exceeds a threshold critical individual error rate 614, the data rate may be decreased to a minimum data rate supported by the audio devices. If the individual error rate 604 is less than the maximum individual error rate 608 and greater than the minimum individual error rate 610, the data rate may remain unchanged.

The data rate module 730 may additionally determine a cumulative error rate based on the response data 114 received from slave devices 106. For example, the response data 114 may include retransmission requests 602, individual error rates 604, and so forth. The cumulative error rate may include a count or percentage of data packets provided to the slave devices 106 that are associated with retransmission requests 602. The data rate module 730 may further determine correspondence between the cumulative error rate and the threshold data 312. If the cumulative error rate is greater than a threshold maximum cumulative error rate 612, the data rate may be decreased. If the cumulative error rate is greater than a threshold critical cumulative error rate 616, the data rate may be decreased to a minimum data rate supported by the audio devices. If the cumulative error rate is less than the threshold maximum cumulative error rate 612, the data rate may remain unchanged.

In some implementations, the data rate module 730 may increase or decrease the data rate based on the quality data 306. For example, the quality data 306 may include a table or a similar data structure, and the data rate may be increased or decreased by changing the current data rate to a data rate indicated on an adjacent row or column of the table. In other implementations, the data rate module 730 may determine the modified data rate based on the quality data 306 and signal quality measurements 304 of the response data 114. For example, based on correspondence between the signal quality measurements 304 and the quality data 306, a corresponding data rate may be determined. The current data rate may be changed to the corresponding data rate.

Other modules 732 may include audio applications for controlling audio output, such as by controlling the timing or volume of particular audio devices. Other modules 732 may also include encryption modules that may be used to encrypt and decrypt communications between computing devices 702. The other modules 732 may also include modules for receiving user input to configure parameters of audio devices, set threshold values of the threshold data 312, and so forth. Other modules 732 may further include location modules that may be used to determine the location of particular audio devices relative to other audio devices or access points 108. For example, the locations of audio devices may be determined using a radio navigation-based system, such as a Global Positioning System (GPS) receiver, or other terrestrial or satellite-based navigational systems. In still other implementations, the locations of audio devices may be determined using one or more device sensors or other I/O devices 716.

Other data 734 within the data store 722 may include user input data, such as configurations and settings associated with computing devices 702. Other data 734 may also include security data, such as encryption keys and schema, access credentials, and so forth. Other data 734 may additionally include rules, algorithms, and so forth, used to synchronize and control audio output, such as by determining time delays between the emissions of sounds based on the locations of audio devices.

In different implementations, different computing devices 702 may have different capabilities or capacities. For example, servers may have significantly more processor 706 capability and memory 718 capacity compared to the processor 706 capability and memory 718 capacity of audio devices.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A first device in communication with a second device and a third device, the first device comprising:
 one or more memories storing computer-executable instructions; and
 one or more hardware processors to execute the computer-executable instructions to:
 provide audio data comprising a plurality of audio packets to the second device and the third device via a multicast transmission using a first physical data rate;
 receive a first response from the second device, the first response including a first request for retransmission of one or more first audio packets;
 determine a first individual packet error rate associated with the second device based in part on the first response;
 receive a second response from the third device, the second response including a second request for retransmission of one or more second audio packets;

determine a second individual packet error rate associated with the third device based in part on the second response;

determine a cumulative packet error rate based on one or more of a count or a percentage of audio packets associated with the first request for retransmission and the second request for retransmission;

determine that one or more of:
the first individual packet error rate deviates from a threshold range of individual packet error rates; or
the second individual packet error rate deviates from the threshold range of individual packet error rates; and change the first physical data rate to a second physical data rate.

2. The device of claim 1, wherein the threshold range of individual packet error rates includes a threshold individual packet error rate associated with a failure to receive the audio data and the computer-executable instructions are further to:

determine that the first individual packet error rate exceeds the threshold individual packet error rate; and
decrease the first physical data rate to the second physical data rate.

3. The device of claim 1, wherein the threshold range of individual packet error rates includes a threshold individual packet error rate associated with successful receipt of the audio data and the computer-executable instructions are further to:

determine that the first individual packet error rate is less than the threshold packet error rate; and
increase the first physical data rate to the second physical data rate.

4. The device of claim 1, wherein the first individual packet error rate deviates from the threshold range of individual packet error rates, the first response further includes a received signal strength indicator associated with communication of the audio data to the second device, and the computer-executable instructions to change the first physical data rate include computer-executable instructions to:

access quality data that associates received signal strength indicators with corresponding data rates;
determine, based on the quality data, the second physical data rate that corresponds to the received signal strength indicator of the first response; and
provide the audio data using the second physical data rate.

5. A method comprising:
providing data to a first device and a second device at a first physical data rate using a multicast transmission;
receiving a first response from the first device;
receiving a second response from the second device;
determining a first error rate associated with communication of the data to the first device based on the first response;
determining a second error rate associated with communication of the data to the second device based on the second response;
based in part on the first response and the second response, determining a cumulative error rate for transmission of the data to the first device and the second device;
determining that the first error rate deviates from a threshold individual error rate associated with failure to receive the data by the first device;
determining that the first physical data rate is a minimum data rate usable by the first device; and transmitting a notification indicative of the first device and correspondence between the first physical data rate and the minimum data rate.

6. The method of claim 5, wherein at least one of the first response or the second response further includes a request for retransmission of one or more data packets, and the cumulative error rate is determined based on one or more of:
a count of the one or more data packets associated with the first response and the second response; or
a percentage of total data packets provided to the first device and the second device that is represented by the one or more data packets associated with the first response and the second response.

7. The method of claim 5, wherein:
the second error rate exceeds the threshold individual error rate, the method further comprising decreasing the first physical data rate to a second physical data rate.

8. The method of claim 5, further comprising:
determining that the second error rate is less than a threshold individual error rate associated with successful receipt of the data by the second device; and
increasing the first physical data rate to a second physical data rate.

9. The method of claim 5, wherein the second response further includes a signal quality measurement associated with communication of the data to the second device, the method further comprising:
accessing first quality data that associates signal quality measurements for the second device with corresponding physical data rates for transmission to the second device; and
determining a second physical data rate based on the signal quality measurement and the first quality data; and
changing the first physical data rate to a second physical data rate.

10. The method of claim 9, further comprising:
determining one or more of a device type or a coexistence characteristic associated with the second device; and
determining that the first quality data corresponds to the one or more of the device type of the coexistence characteristic.

11. The method of claim 5, further comprising:
determining a first device type associated with the first device and a second device type associated with the second device;
accessing first quality data that associates signal quality measurements for the first device type with corresponding data rates;
accessing second quality data that associates signal quality measurements for the second device type with corresponding data rates;
determining a first signal quality measurement for the first device and a second signal quality measurement for the second device;
based on the first quality data, determining a first data rate that corresponds to the first signal quality measurement;
based on the second quality data, determining a second data rate that corresponds to the second signal quality measurement; and
determining the first physical data rate based on the lesser of the first data rate and the second data rate.

12. The method of claim 5, further comprising:
determining that the first error rate exceeds a threshold critical individual error rate associated with failure to receive the data by the first device; and
decreasing the first physical data rate to a minimum data rate usable by the first device and the second device.

13. The method of claim 5, further comprising:
determining that the cumulative error rate deviates from a threshold cumulative error rate associated with failure to receive the data by the first device and the second device; and
changing the first physical data rate to a second physical data rate in response to the cumulative error rate deviating from the threshold cumulative error rate.

14. A system comprising:
one or more memories storing computer-executable instructions; and
one or more hardware processors to execute the computer-executable instructions to:
determine a first physical data rate for providing data from a first device to a second device and a third device;
provide the data from the first device to the second device and the third device at the first physical data rate using a multicast transmission;
determine, from the second device, a first individual error rate associated with receipt of the data;
determine, from the third device, a second individual error rate associated with receipt of the data;
determine a cumulative error rate for transmission of the data from the first device to the second device and the third device;
determine that the first individual error rate exceeds a threshold critical individual error rate associated with failure to receive the data by the second device;
change the first physical data rate to a minimum physical data rate usable by the second device and the third device.

15. The system of claim 14, wherein the computer-executable instructions to determine the first physical data rate include computer-executable instructions to:
determine a first signal quality measurement from the second device, wherein the first signal quality measurement indicates a quality of a communication between the first device and the second device;
determine a second signal quality measurement from the third device, wherein the second signal quality measurement indicates a quality of communication between the first device and the third device;
determine first correspondence between the first signal quality measurement and quality data that associates signal quality measurements with corresponding physical data rates;
based on the first correspondence, determine a first data rate;
determine second correspondence between the second signal quality measurement and the quality data;
based on the second correspondence, determine a second data rate;
determine the first physical data based on a lesser of the first data rate and the second data rate.

16. The system of claim 14, wherein the second device provides the first individual error rate via a unicast transmission to the first device.

17. The system of claim 14, further comprising computer-executable instructions to:
determine that the second individual error rate exceeds a threshold individual error rate associated with failure to receive the data by the second device;
wherein the changing of the first physical data rate is further performed in response to the second individual error rate.

18. The system of claim 14, further comprising computer-executable instructions to:
determine that the second individual error rate is less than a threshold individual error rate associated with successful receipt of the data by the second device;
wherein the changing of the first physical data rate is further performed in response to the second individual error rate.

19. The system of claim 14, further comprising computer-executable instructions to:
determine that the first physical data rate is equal to the minimum physical data rate; and
generate a notification indicative of correspondence between the first physical data rate and the minimum physical data rate.

20. The system of claim 14, further comprising computer-executable instructions to:
determine, from the second device, a signal quality measurement associated with communication of the data to the second device; and
determine the minimum physical data rate based on correspondence between the signal quality measurement and quality data that associates signal quality measurements with corresponding data rates.

* * * * *